Dec. 27, 1966   R. DEFLANDRE   3,293,990
ROTATABLE DEVICE FOR SUPPORTING PARTS TO BE MACHINED
Filed July 26, 1965   11 Sheets-Sheet 1

Dec. 27, 1966   R. DEFLANDRE   3,293,990
ROTATABLE DEVICE FOR SUPPORTING PARTS TO BE MACHINED
Filed July 26, 1965   11 Sheets-Sheet 5

Dec. 27, 1966  R. DEFLANDRE  3,293,990
ROTATABLE DEVICE FOR SUPPORTING PARTS TO BE MACHINED
Filed July 26, 1965  11 Sheets-Sheet 6

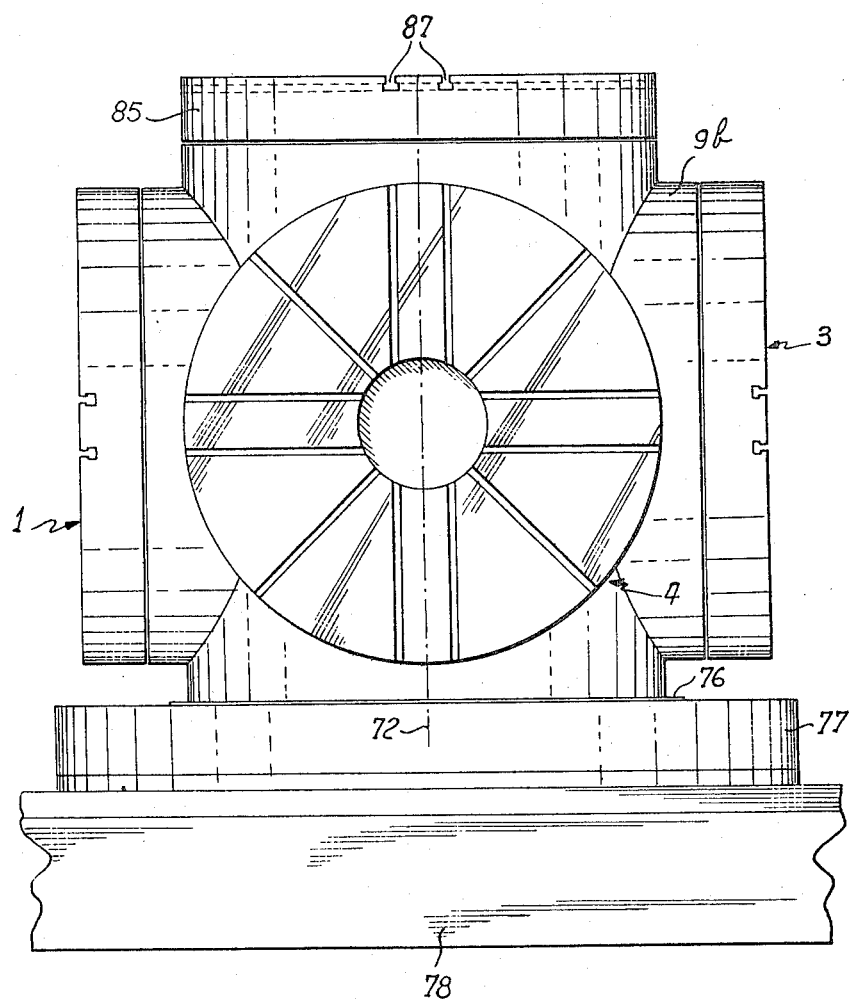

Dec. 27, 1966    R. DEFLANDRE    3,293,990
ROTATABLE DEVICE FOR SUPPORTING PARTS TO BE MACHINED
Filed July 26, 1965    11 Sheets-Sheet 8
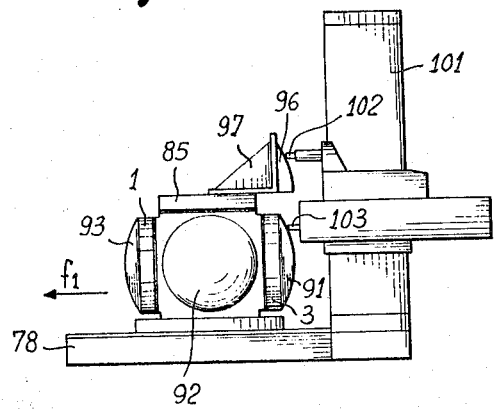
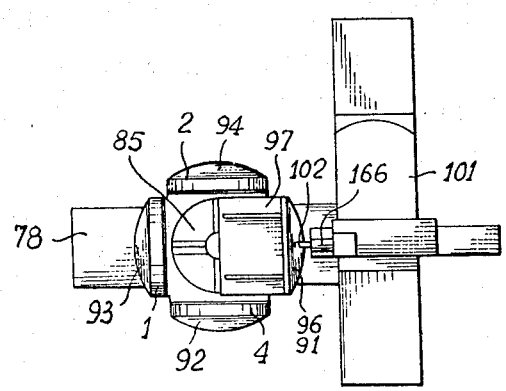
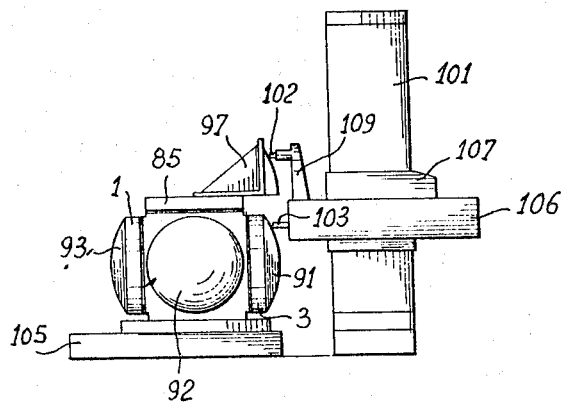

Dec. 27, 1966     R. DEFLANDRE     3,293,990
ROTATABLE DEVICE FOR SUPPORTING PARTS TO BE MACHINED
Filed July 26, 1965     11 Sheets-Sheet 11

United States Patent Office 3,293,990
Patented Dec. 27, 1966

3,293,990
ROTATABLE DEVICE FOR SUPPORTING PARTS TO BE MACHINED
René Deflandre, Paris, France, assignor to Societe dite: DEREFA, Etablissement pour le Developpement, Recherches et Fabrications Industrielles
Filed July 26, 1965, Ser. No. 474,698
Claims priority, application France, Aug. 6, 1964, 984,329
11 Claims. (Cl. 90—58)

In the art of machining parts which are of regular geometrical shape or in which different machining operations must be effected according to a certain symmetry, it is advantageous to be able to secure the parts on cradles having a horizontal or a vertical axis so that they may be rotated in order to position them successively in the necessary or most suitable working positions without necessitating their being dismounted, handled and remounted on the cradles. This enables the operation times to be considerably reduced and the accuracy of the machining operations to be very substantially improved. Cradles of this type are useful for very varied operations, such as piercing, boring or even circular milling, and even turning, if their rotatable bearing surfaces are adapted to high speeds and if their driving means are sufficiently highly powered for this purpose.

In certain cases of quantity production, it may be proved useful for the purpose of reducing the cost price, to use a row of cradles, each on a vertical or a horizontal axis and having as many parts undergoing machining as there are cradles, the cradles being revolved only when all the same machining operations corresponding to a determined position of the parts have been executed.

However, it will be apparent that with this method the installations become longer with an increasing number of cradles and furthermore necessitates a large horizontal travel for the machine being used, since the latter must be presented successively to each of the cradles. The working areas which are available in factories are not always suitable for installations of this type and in any case their cost is relatively high.

Finally, it is very difficult to ensure that all the cradles are set up and maintained level and straight with respect to each other and to the machine; if this cannot be done, the errors in machining when the machine is then presented successively at each of its working stations can become considerable.

One object of the invention is a rotatable device for supporting parts to be machined, which minimizes or substantially obviates the above-mentioned disadvantages of known devices.

To this end, the invention consists in a rotatable device having a plurality of locations for supporting parts to be machined, said device comprising a housing, and means for mounting a plurality of cradles in said housing to rotate about horizontal axes, said cradles being situated in different planes.

Other objects and advantages will become apparent from the detailed description which is to follow.

A device according to the invention, which may be mounted on a rotatable horizontal cradle of any suitable conventional type is particularly small and enables the travel of the machine being used to be confined to the travel necessary for machining one part, since, after machining said part mounted on one cradle, it is only necessary to pivot the assembly in order to present to the tool of the machine the part mounted on the next succeeding cradle. Moreover, since as all the cradles are mounted on a common housing of relatively small dimensions, the difficulties of precise positioning and levelling of the cradles with respect to one another are reduced, because once the device is set up, the operations position for the machine becomes common to all cradles and all parts carried thereby.

In an embodiment, the axes of the different rotatable cradles are arranged as a star, in the same horizontal plane, however many cradles there may be.

In another embodiment comprising only two cradles, the axes of the latter are parallel and carried by two pins arranged head to tail, so that the surfaces for supporting the parts to be machined are orientated in two opposite directions.

In another particular embodiment, the housing is mounted on a rotatable horizontal plate or cradle incorporated with the assembly and the vertical geometrical pivot axis of which is equidistant from the surfaces of all the rotating cradles having horizontal axes.

In order that the invention may be more clearly understood reference will now be made to the accompanying drawings which show some embodiments thereof by way of example, and in which.

Figure 1:
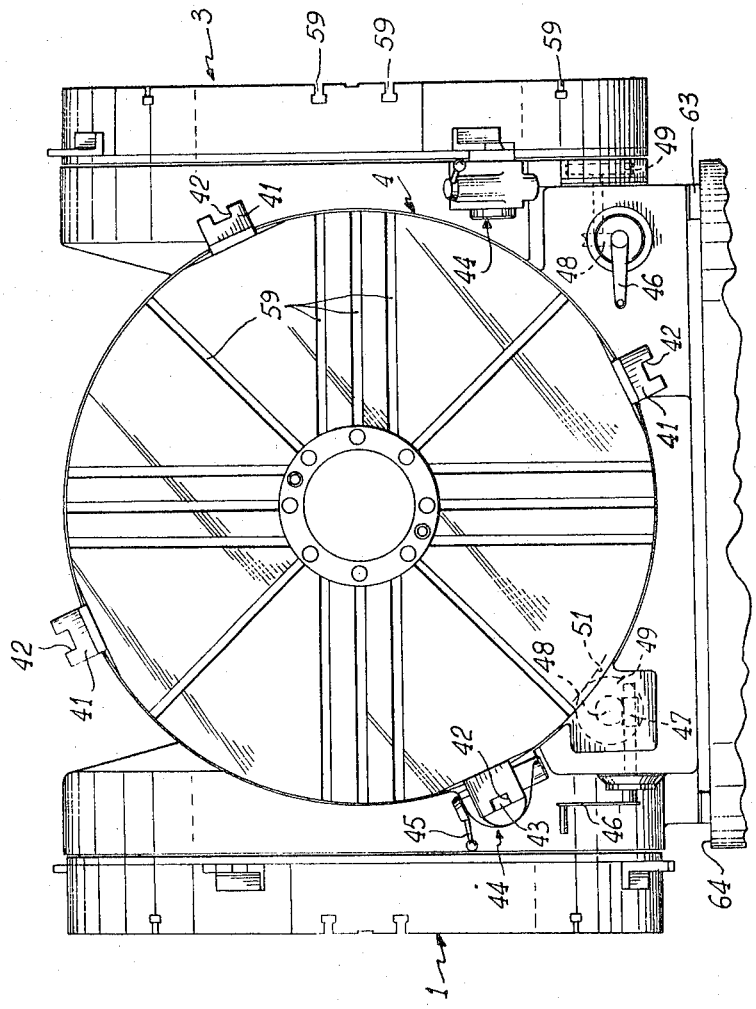
FIGURE 1 shows an elevational view of the first embodiment of a revolving device, according to the invention, having four cradles.
Figure 2:
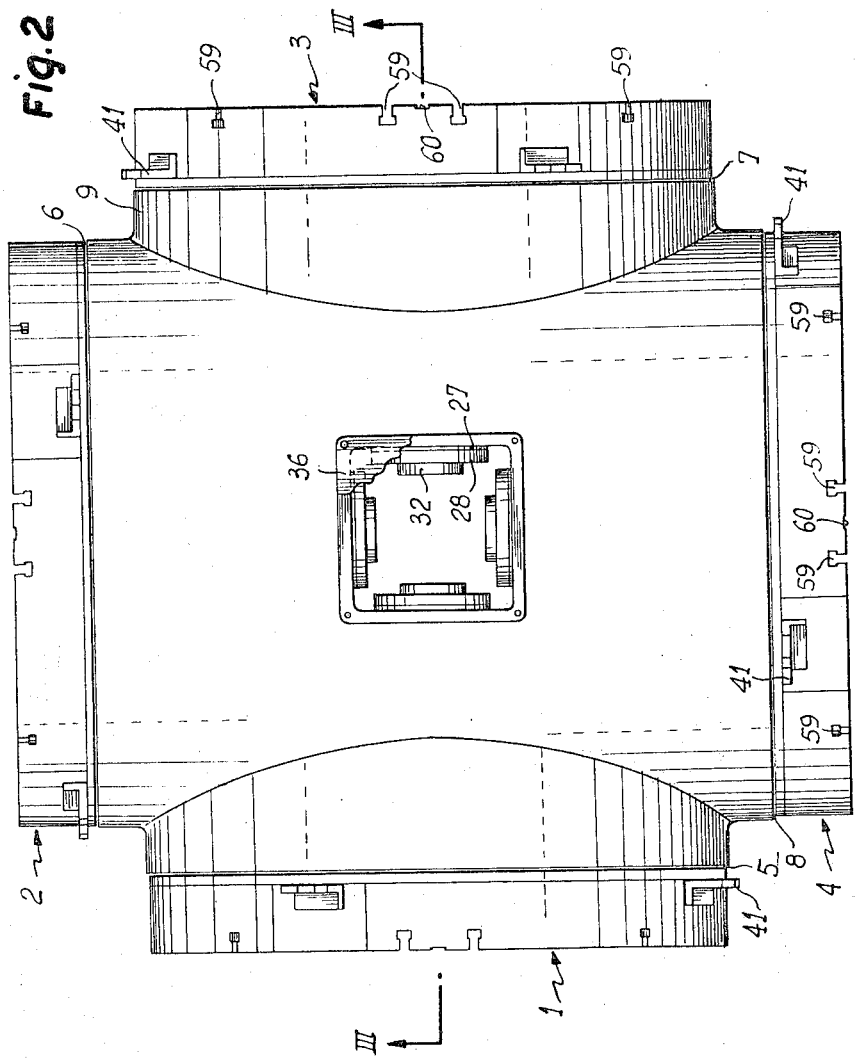
FIGURE 2 shows a plan view corresponding to FIGURE 1.
Figure 3:
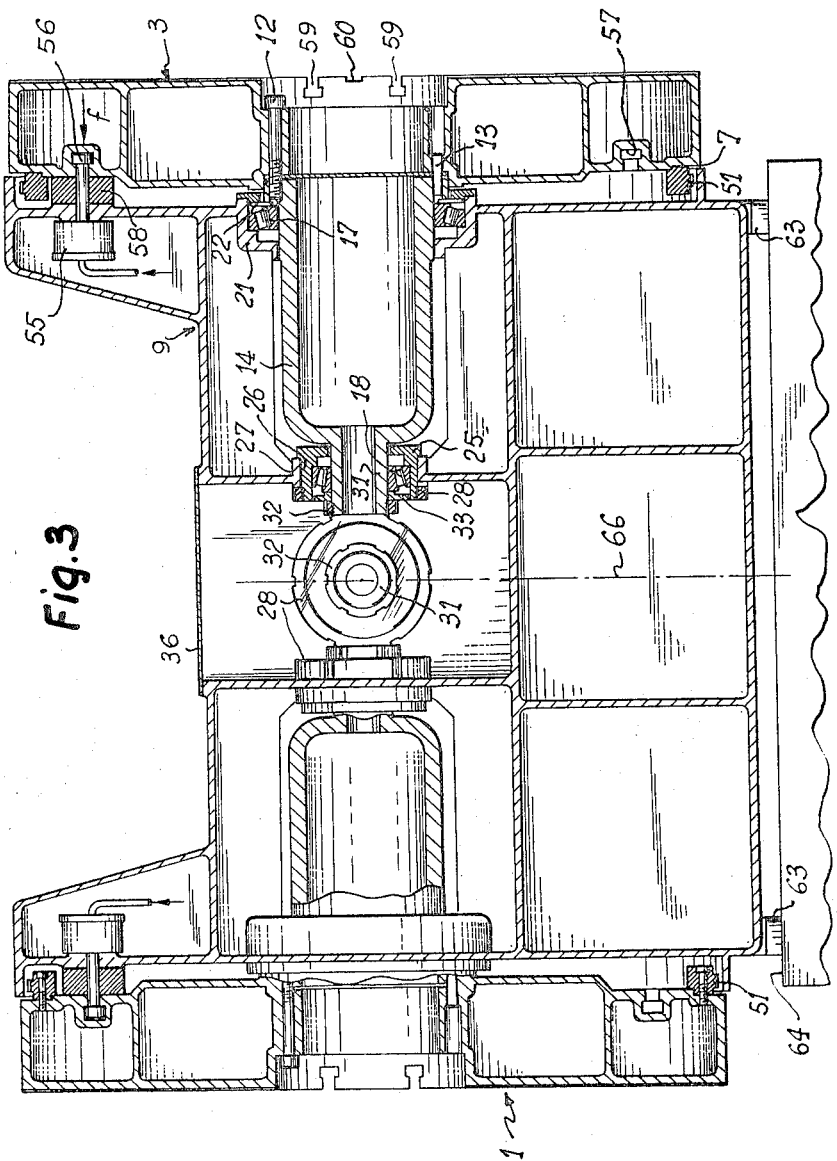
FIGURE 3 shows a vertical section taken along the line III—III of FIGURE 2.
Figure 4:
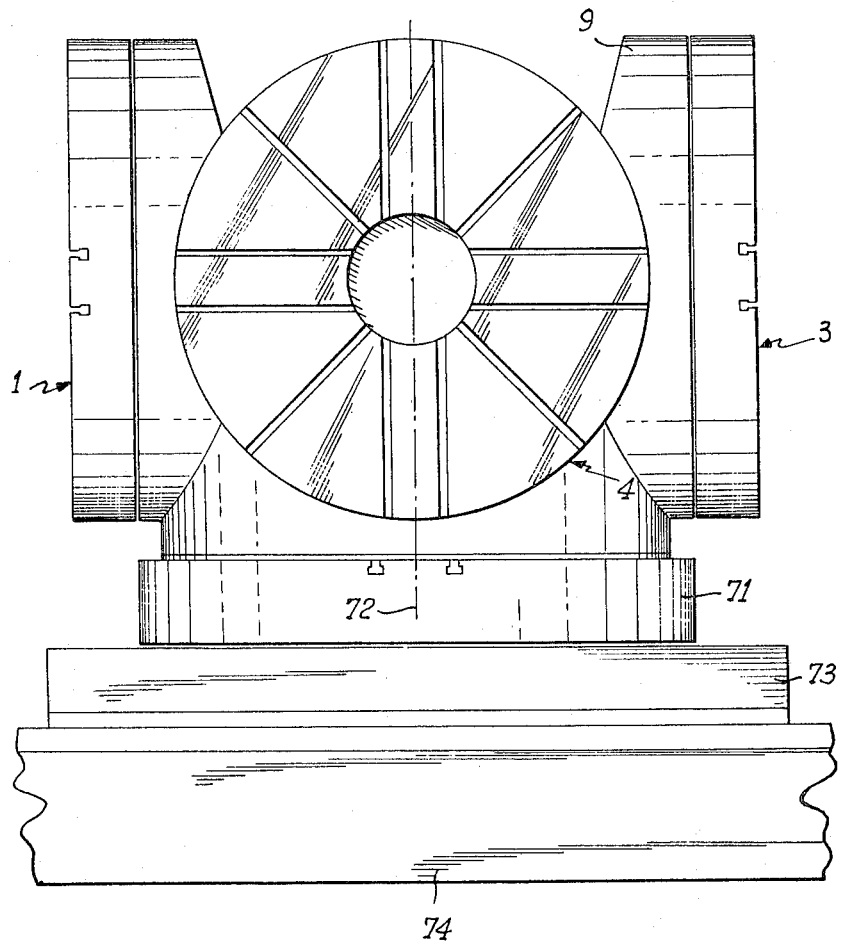
Figure 5:
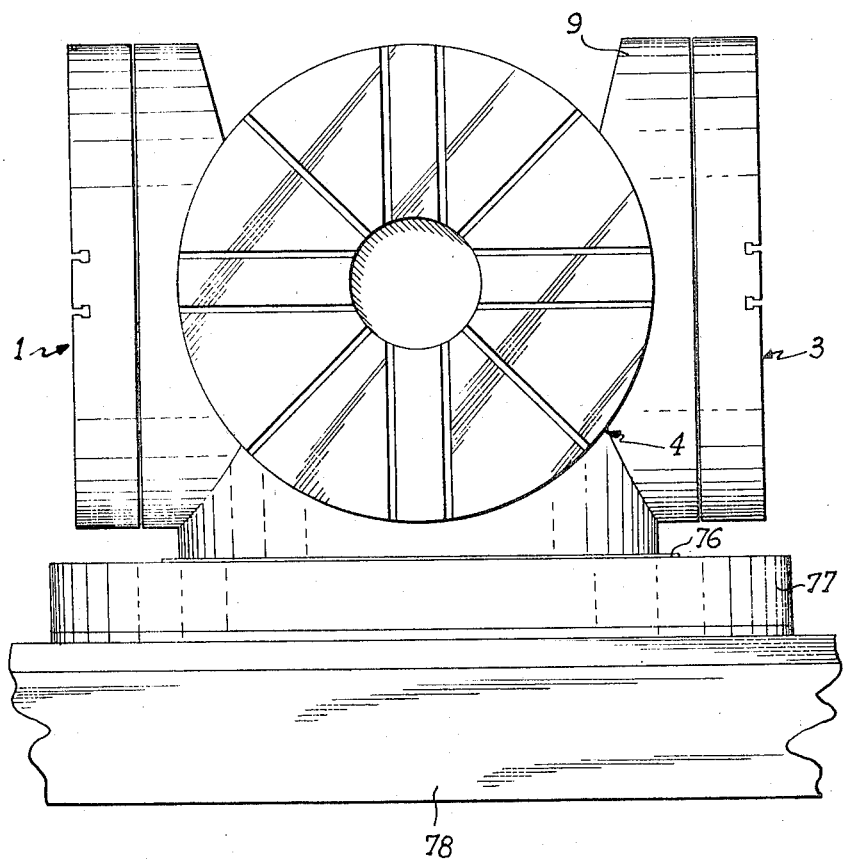
Figure 6:
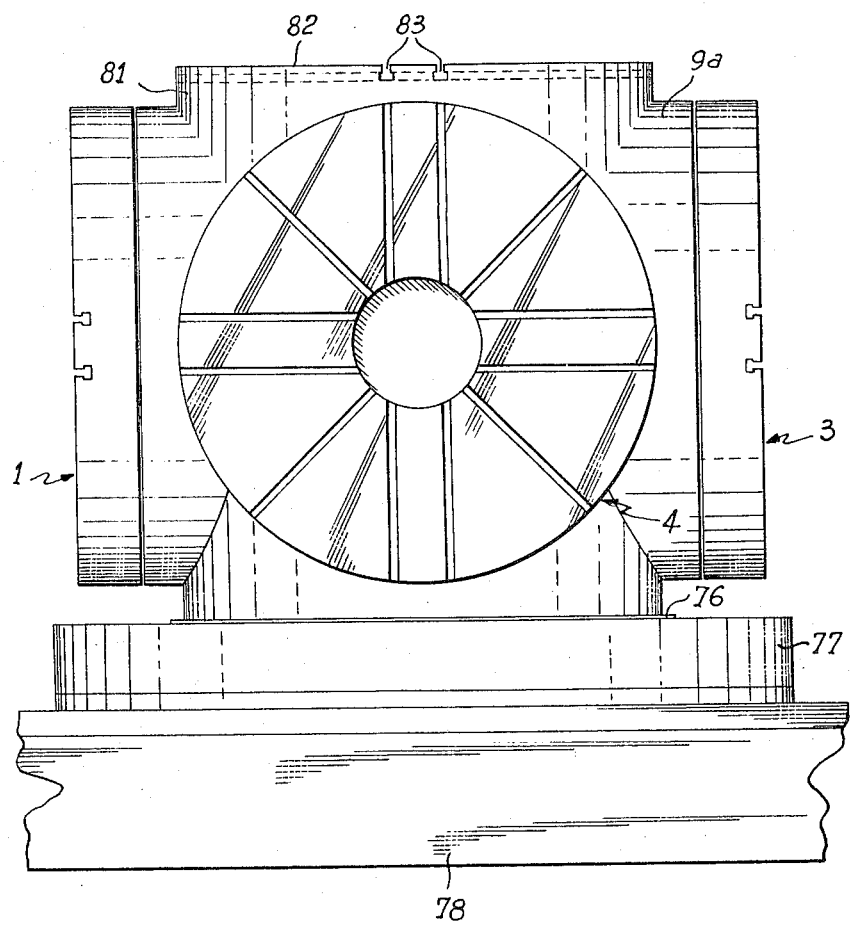
Figure 11:
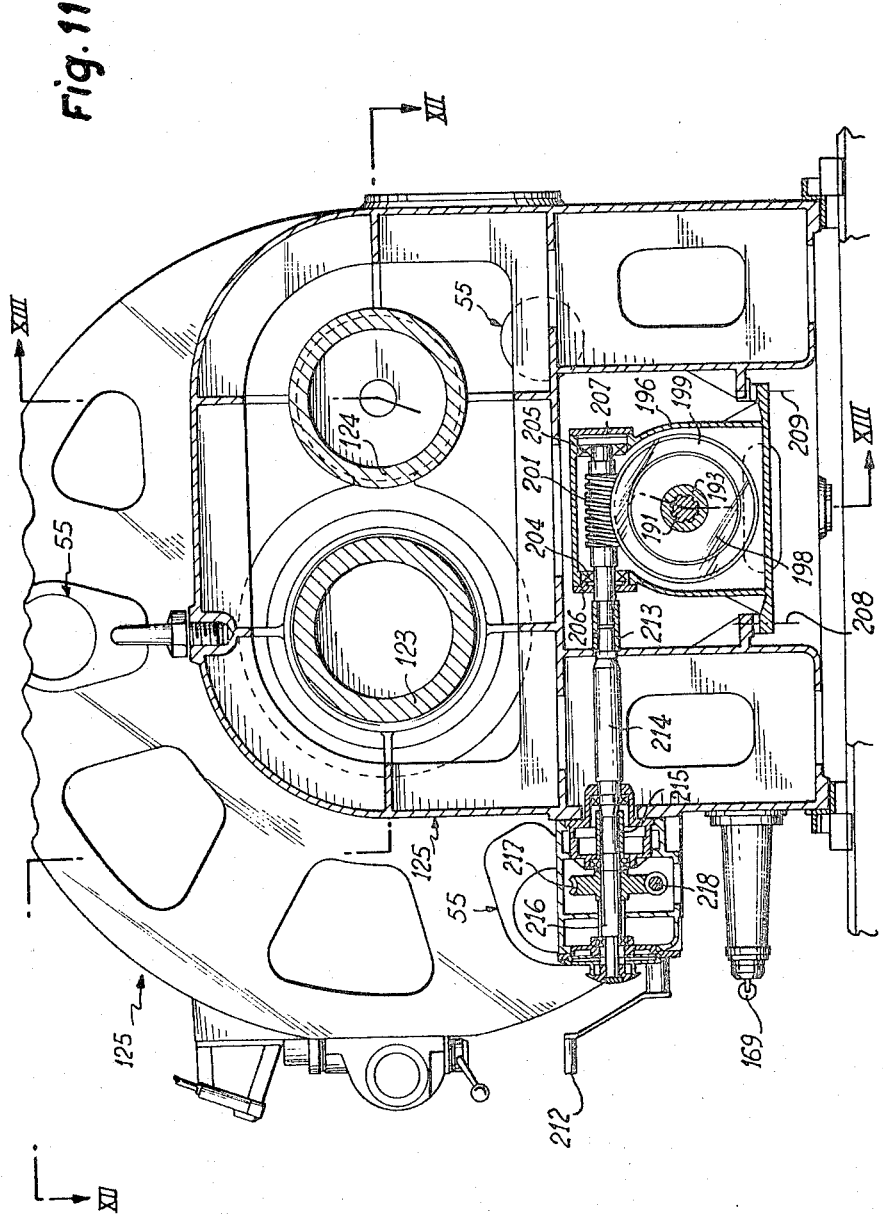
Figure 12:
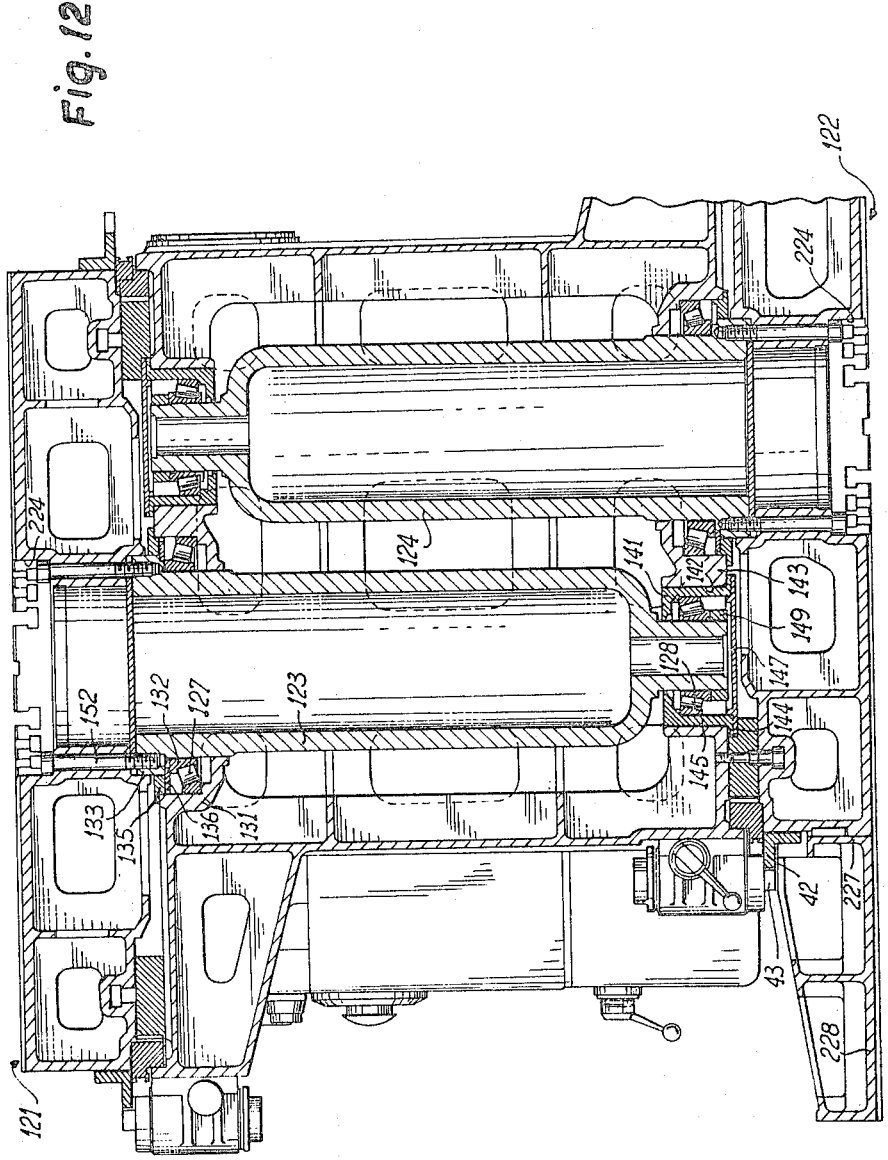
Figure 13:
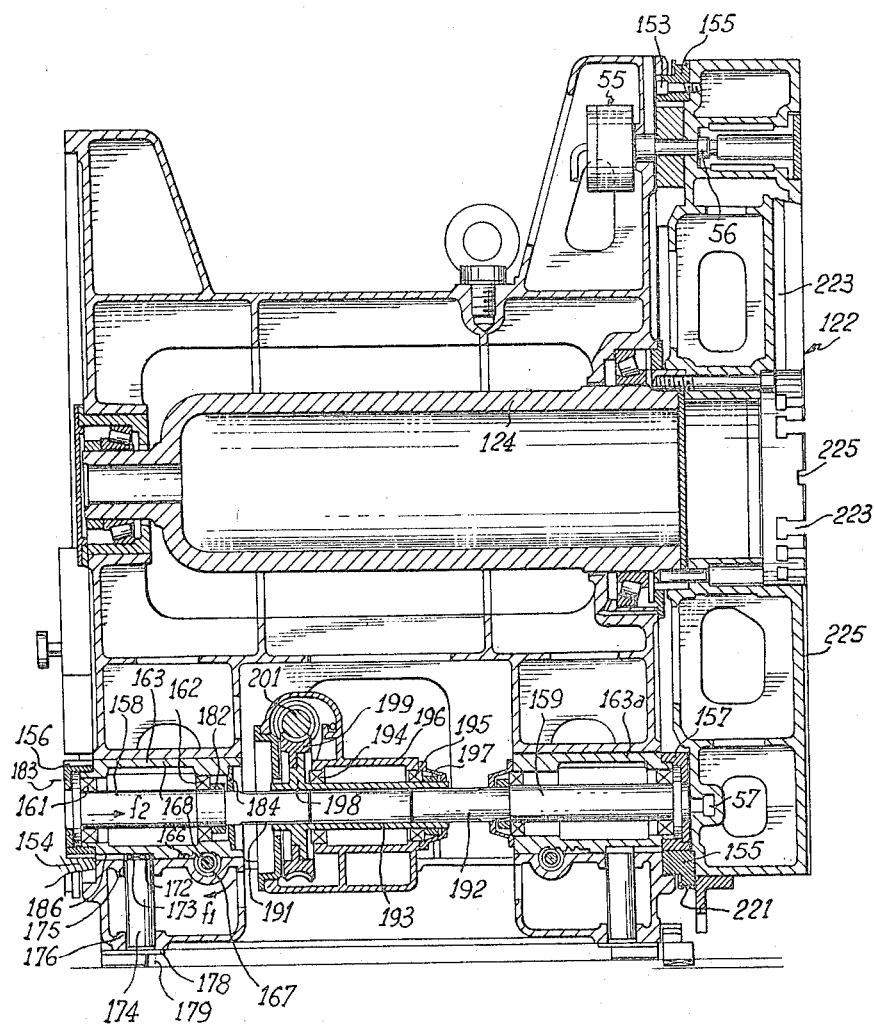

FIGURE 4 shows an elevational view of a device having four cradles similar to that of FIGURES 1 to 3, mounted on a rotatable horizontal plate or cradle mounted on a bed plate which may move in a horizotnal direction on a table, FIGURE 5 shows an elevational view of a device similar to that of FIGURES 1 to 3, but provided with means for rotation about a vertical axis, and means for horizontal translation, FIGURE 6 shows an elevational view of a device similar to that of FIGURE 5, and the upper part of which is provided with means for fixing templates or various control gear, FIGURE 7 shows an elevational view of a device similar to that of FIGURE 6, but the lower part of which is provided with a rotatable horizontal plate, FIGURES 8 and 9 schematically show, respectively in elevational and plan views, the use on a milling-boring machine, of a device of the type such as that shown in FIGURE 7 provided with translation means, FIGURE 10 shows a view similar to that of FIGURE 8 and shows the use of a similar device but not provided with supporting means which may be moved in translation, FIGURE 11 shows a vertical section taken along the line XI—XI of FIGURE 12, of another embodiment of a device according to the invention having two machining cradles, FIGURE 12 shows a section along the broken line XII—XII of FIGURE 11, and FIGURE 13 shows a vertical section taken along the broken line XIII—XIII of FIGURE 11.

Referring now to the drawings in the part-carrying device having multiple locations shown in FIGURES 1 to 3, four cradles 1, 2, 3, 4 are mounted to rotate about concurrent horizontal geometrical axes, on the four corresponding vertical surfaces of a housing 5.

In the embodiment shown, the four cradles are identical and mounted in the same manner. Thus the cradle 3 is secured, by means of screws 12 and centering feet 13, on a shouldered end of a hollow pin 14 supported for rotation in the housing 9 by two tapered roller bearings 17, 18 respectively arranged at the two ends of said pin.

The external ring of the bearing 17 is lodged in a case 21 of the housing 9, whilst its external ring is supported against the shoulder of the pin 14, by means of a thick key 22 enabling the pin 14 and consequently the cradle 3 to have an accurate axial positioning with respect to the corresponding surface 7 of the housing 9, preferably provided with partial supporting surfaces (not shown) provided with suitable lubricating means.

The external ring of the other roller bearing 18 is lodged in a replaceable case 26 mounted in a bore 26 of a boss 27 of the housing 9 and fixed, in said bore, by means of a clamping nut 28 mounted on a corresponding threaded end of said case. The internal ring of this bearing is mounted on a boss 31 of the corresponding end of the pin 14 and it is axially positioned on said boss by means of an adjusting nut 32, through the intermediary of a cover 33.

A cover 36 hermetically closes the central grooved part of the housing 9.

Each of the cradles is provided with accurate angular positioning means of any suitable conventional type, which has been schematically shown by parts such as 41 each having a notch 42 in which a bolt 43 carried by the housing, in case 44, may be lodged, and provided with a manual control lever 45. In the example shown, four positioning parts 41 are provided, by means of which the cradle 4 may be given four different angular positions at 90° from one another. It is obvious that any other positioning system may be used and any desired number of angular positions of the cradles may be provided.

Each plate is, in addition, provided with suitable indexing means. By way of example, a crank-handle 46 mounted to rotate in the housing 9 and carrying an endless screw 47 engaged with a worm wheel 48 secured to a toothed wheel 49, itself engaged with a toothed sprocket wheel 51 secured to the corresponding cradle.

Each cradle is, in addition, provided with a suitable clamping system such as the hydraulically controlled clamping system shown schematically at 55 and comprising a jack whose piston is integral with a rod, the square head 56 of which is engaged in a groove 57, of corresponding T section, made in the internal surface of the cradle. The force exerted by the rod 56 in the direction of the arrow $f$ for example, under the action of flexible means incorporated with the jack 55, applies the inner surface of the cradle 3 strongly against the surface of a corresponding bearing part 58 secured to the casing 9. Unclamping, in opposition to the force of the above-mentioned flexible means, is effected under the effect of pressurized oil being passed to the jack 55.

Each cradle is provided with suitable means for fixing the parts to be machined, particularly in the form of T shaped grooves, as indicated by way of example at 59, and straightening grooves 60.

Of course, all the described mounting structures and all the indexing, locking, and clamping means are given only by way of example, therefore the manual indexing control having a crank handle 46 could for example be replaced by a control comprising an electric motor.

The lower part of the housing 9 is provided with bosses 63 suitably shaped and arranged in order that the multilocation revolving device can be placed, centered, straightened and secured to a horizontal rotating plate of a machine tool, as indicated at 64, so that the vertical geometrical axis 66 of the device coincides with the vertical rotation axis of the rotating plate of the machine on which it is mounted.

FIGURE 4 shows an elevational view of a revolving device of the type such as that shown in FIGURES 1 to 3, fixed on a rotatable plate 71 mounted to rotate, about a vertical axis 72, on a bed plate 73 which may be displaced over a table 74, the vertical axis 72 being equidistant from the surfaces of the four cradles 1, 2, 3, 4.

Another embodiment shown in FIGURE 5 differs from the embodiment in FIGURE 4 only by the fact that instead of being fixed on an independent assembly comprising a plate rotating on a bed plate sliding on a table, the four cradle device itself comprises a lower rotatable part 76 mounted in a bed plate 77 mounted to slide over a table 78.

FIGURE 6 shows a modification of the embodiment of FIGURE 5, in which the upper part 81 of the housing presents a flat horizontal surface 82 provided with means such as T shaped grooves 83 for example, suitable for fixing any desired member, for example a copying lathe, or a machine control apparatus.

The embodiment shown in FIGURE 7 differs from the embodiment of FIGURE 6 only by the fact that instead of being fixed, the upper part 85, intended to receive the various members or apparatus, is in the form of a plate which may rotate about an axis which is situated in line with the vertical rotation axis 72 of the device. The plate 85 is also provided with suitable fixing means such as for example T shaped grooves 87.

FIGURES 8 and 9 show an example of using the device according to FIGURE 7. Four identical parts 91, 92, 93 and 94 to be machined are respectively fixed to the four cradles 3, 4, 1 and 2 of the device. A sample part or pattern 96 having the same profile as that of the finished part is fixed to the vertical surface of a square 97, the horizontal surface of which is secured so as to be flat on the upper rotatable plate 85. The assembly is placed in front of a milling-boring machine having a bed plate, only the vertical standard 101 of which has been schematically shown and which is indicated at 102, whilst the machining tool or shaper is indicated at 103. The profile of the part 91 is machined, then the device is made to move back on the table 78 in the direction of the arrow $f1$, so as to detach the part 91 from the tool 103, and the pattern 96 from the feeler 102, the assembly is made to pivot so as to lead the following part 92 to the machining location, at the same time as the other rotatable plate 85 is made to pivot in the opposite direction with respect to the housing of the device, so that the pattern 96 remains at the copying location. The tool on the vertical standard of the milling machine is approached and this second part 92 is then machined.

The following parts are machined in the same manner. During the machining of one part, a finished part may be dismounted and a blank part may be mounted again. If the cradles are provided with angular advance means, circular milling operations may be effected on parts mounted on said cradles.

FIGURE 10 schematically shows an example of using a device having four cradles, but which is not provided with a horizontal slide bar system in this example, it is fixed on the bed plate 105 of the milling-boring machine, the latter then being fitted with a headstock 106 mounted to slide horizontally on a bed plate 107 carried by the vertical standard 101 of the machine. In this case, the feeler 102 is then mounted for example on a support 109 fixed on the headstock 106 of the machine. The working cycles are identical with those described in the example of FIGURES 8 and 9.

FIGURES 11 to 13 show another embodiment which comprises only two cradles 121, 122 carried respectively by two pins 123, 124 which are arranged head to tail parallel with respect to each other in the casing 125, instead of being arranged in a star shape, as in the above described embodiment which enables, in the particular case of an embodiment having two cradles, the bulk of the assembly to be substantially reduced.

The two pins 123, 124 which carry the two plates are each mounted in the same manner as the pins of the embodiment of FIGURES 1 to 3; thus for example, the pin 123 is supported at its end which carried the plate 121, by a large tapered roller bearing 127, and at its opposite end by a smaller tapered roller bearing 127, and at its opposite end by a smaller tapered roller bearing 128. The external ring of the bearing 117 is located in the bore of a boss 131 of the casing 125, whilst the internal ring of said bearing is mounted on a cylindrical surface 132 of the pin 123 and is supported against the annular surface of a flange 133 which terminates this end of the pin. A cover 135 closes the housing of the bearing in the casing and a washer 136 forms an obstacle for retaining the bearing lubricant.

Similarly, the opposite bearing 128 is located in a casing 141 mounted in a bore 142 of a boss 143 of the casing 125, said case having a flange 144 by which it is secured to the casing by means of screws shown only by their axes 145 and serving at the same time as means for fixing a cover 147 for closing the case. The internal ring of the bearing 128 is supported against a nut 149 for axially positioning the pin screwed on the corresponding threaded end of the latter.

The two plates 121, 122 are centered on the flanges of the corresponding ends of the two pins 123, 124 and they are fixed on the latter by means of screws such as 152. The two plates are rotatable by means of two internally toothed sprocket wheels 154, 155 (FIGURE 13) respectively secured to these two plates by means of screws 153 and in simultaneous engagement with two pinions 156, 157 secured to two shafts 158, 159 arranged in line with one another on a geometrical axis parallel to the axes of the two cradle-carrying pins and at an equal distance from the latter.

The shaft 158 is supported by two conical roller bearings 161, 162 mounted in a cylindrical sleeve 163 which may slide in a bore 164 of the casing 125, under the action of a control system comprising a portion of toothed rack 166 cut in the external surface of said sleeve, a toothed pinion 167 engaged with said toothed rack and carried by a pin 168 at right angles to the axis of the sleeve 163 and terminated by an operating handle 169 (FIGURE 11). The sleeve 163 is angularly positioned in respect to the casing of the device by a longitudinal keyway 172 in which is engaged a key 173 formed in the end of a rod 174 mounted in the coaxial bores of two bosses 175, 176 of the casing, said rod terminating in a flange 178 by means of which it is fixed to the casing by screws simply shown by their axes 179.

The axial positioning of the shaft 158 in the case 163 is ensured by a nut 182 screwed on a corresponding threaded part of said shaft and by the toothed pinion 156 secured on this shaft by means of screws simply shown by their axes 183, the sleeve 163 being closed on the inner side by a cover 184. When the casing 163 occupies the position shown in FIGURE 13, the pinion 156 is engaged with the internally toothed sprocket wheel 153 secured to the plate 121. If, by means of the handle 169, the shaft 168 is made to pivot, the pinion 167 secured to this shaft displaces the case axially, by means of the toothed rack 166, in the direction of the arrow f2, so that the toothed pinion 156, secured to the shaft 158 becomes lodged in a corresponding cylindrical tongue-and-groove joint 186 of the casing 125 and thus is no longer engaged with the internal toothed sprocket wheel 154 for driving the cradle 121.

The assembly of the shaft 159 which is the same as that of the shaft 158 will not be described in detail.

The two shafts 158, 159 which carry the pinions for rotating the two plates have their inner ends channelled as indicated at 191, 192 and are respectively engaged in the two ends of a corresponding channelled tubular shaft 193 supported by means of two tapered roller bearings 194, 195 in an auxiliary casing 196 fixed in the main casing 125 by means of screws 208, 209 simply indicated by their axes in FIGURE 11.

The axial positioning of the tubular shaft 193, with respect to the casing 196, is ensured on the one hand by a nut 197 screwed on said shaft and on the other hand by a boss 198 of this shaft on which is mounted a hollow wheel 199 engaged with an endless screw 201 also supported in the auxiliary casing 196 by means of two tapered roller bearings 204, 205 (FIGURE 11) held back by two covers 206, 207.

The endless screw 201 may be rotated from a manually controlled crank-handle 212, by means of a transmission which comprises a coupling sleeve 213, an intermediate shaft 214, another coupling sleeve 215, a shaft 216, a hollow wheel 217, another endless screw 218 and a reversing by bevel pinions (not shown) the intermediate shaft 214 and a shaft 216 which carry the hollow wheel 217 being mounted to rotate in suitable bearings located in the casing 125.

It is obvious that this control by a crank-handle may be replaced by any other suitable control desired, particularly by an automatic control utilising an electric motor. For example, a control by means of a crank handle will be used for simple movements for angularly indexing the plates and a control by a motor for circular milling operations or possibly for turning operations then necessitating a motor and a sufficient transmission of power in order to withstand the cutting forces of the tool.

As the toothed pinion 156 and the internally toothed sprocket wheel 154, or even the toothed pinion 157 and the internally toothed wheel 155 are engaged by corresponding axial displacements of two sleeves 163, 163a, the coupling of the central rotational control system is ensured either to the cradle 121 or to the cradle 122.

In the upper part of the FIGURE 13 is shown a clamping device 55 which is for example of the same type as that shown in the upper part of FIGURE 3 and which operates in the same manner; it comprises a clamping rod 56, the head of which is engaged in a T-shaped groove 57 of the cradle 122.

Parts 42 for accurately positioning the cradles angularly in cooperation with bolts 43 have also been indicated as in the embodiment of FIGURES 1 to 3. A device for accurately stopping this rotational movement of the cradles by feeler controls (not shown) mounted in a groove in dovetail such as 221 formed for example in the periphery of the external smooth cylindrical surface of the internally toothed sprocket wheel 155 (see FIGURE 13) may also be used.

The cradles have T-shaped grooves 223 for fixing the parts to be machined a centring 224 and grooves 225 enabling them to be straightened. Arms 228 may be fixed against cradles 227 so that parts having a diameter greater than the diameter of said cradles may be carried thereby.

As in the above described embodiments the base of the casing of the device is provided with marking, straightening and fixing means on a machine table, a bed-plate or also on a rotatable plate.

I claim:

1. A rotatable device having a plurality of locations for supporting parts to be machined, said device comprising a housing, a plurality of cradles, means for mounting said cradles in such housing to rotate about horizontal axes, said cradles being located in different planes.

2. A device according to claim 1, wherein the axes of the rotatable cradles are arranged in a star pattern in the same horizontal plane.

3. A device according to claim 1, comprising only two cradles, the axes of which are parallel and whose surfaces for supporting the parts to be machined are orientated in two opposite directions.

4. A device according to claim 1, wherein each cradle is provided with angular-positioning and clamping means.

5. A device according to claim 1, comprising a control means to rotate each cradle about its axis.

6. A device according to claim 1, wherein the upper part of said device has a flat surface for the mounting of different apparatus members thereon.

7. A device according to claim 1, wherein the lower part of the device is provided with straightening and fixing means on a horizontal rotatable plate.

8. A device according to claim 1, wherein the device housing is secured on a horizontal supporting plate mounted to rotate on a bed plate itself mounted to slide over a table.

9. A device according to claim 1, wherein the lower part of said device is mounted directly to rotate on a bed plate slidable on a table.

10. A device according to claim 1, wherein the means for rotating each cradle comprise a toothed sprocket wheel integral with said cradle and engaged with a toothed wheel connectible to a transmission having an individual manual control or to a motor mounted in said casing for said device.

11. Device according to claim 3, wherein the means for rotating said cradles comprise a common movement connecting shaft connectible selectively by means of two clutches and two toothed pinions, to two toothed sprocket wheels respectively secured to said two cradles.

No references cited.

WILLIAM W. DYER, JR., *Primary Examiner.*

G. A. DOST, *Assistant Examiner.*